United States Patent
Huber et al.

(10) Patent No.: US 6,641,084 B1
(45) Date of Patent: Nov. 4, 2003

(54) SOLID OXIDE FUEL CELL AS AUXILIARY POWER SOURCE INSTALLATION IN TRANSPORT AIRCRAFT

(75) Inventors: James M. Huber, Kent, WA (US); Joel D. Lindstrom, Somerset, WI (US); David L. Daggett, Snohomish, WA (US); Michael G. Friend, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/177,427

(22) Filed: Jun. 21, 2002

(51) Int. Cl.[7] .............................................. B64D 41/00
(52) U.S. Cl. .......................................... 244/48; 429/30
(58) Field of Search ................................ 244/53 R, 58; 429/30

(56) References Cited

U.S. PATENT DOCUMENTS

| | | | |
|---|---|---|---|
| 5,340,664 A | * | 8/1994 | Hartvigsen .................... 429/20 |
| 5,722,229 A | | 3/1998 | Provost ...................... 60/39.07 |
| 5,858,568 A | * | 1/1999 | Hsu et al. ...................... 429/13 |
| 6,255,010 B1 | | 7/2001 | George et al. ................. 429/30 |
| 6,296,957 B1 | | 10/2001 | Graage ......................... 429/12 |
| 6,450,447 B1 | * | 9/2002 | Konrad et al. ............. 244/53 R |
| 6,485,852 B1 | * | 11/2002 | Miller et al. .................. 429/17 |

FOREIGN PATENT DOCUMENTS

| | | |
|---|---|---|
| DE | 3832471 A1 | 3/1990 |
| DE | 4001684 | 7/1991 |

OTHER PUBLICATIONS

Minh, Nguyen Q.; Ceramic Fuel Cells; J. Am. Ceram. Soc.; vol. 76, No. 3; 563–588 (1993).

* cited by examiner

Primary Examiner—J. Woodrow Eldred
(74) Attorney, Agent, or Firm—Harnes Dickey & Pierce P.L.C.

(57) ABSTRACT

An auxiliary power unit (APU) for an aircraft utilizing solid oxide fuel cells for providing electrical power. The solid oxide electrolytes of the fuel cells allow for reformed fuel to provide a catalyst for oxygen migration. The auxiliary power unit, utilizing solid oxide fuel cells, can also power systems of the aircraft to produce water for use on the aircraft. Waste exhaust energy may be captured from the APU by a power recovery turbine which drives a compressor to provide aircraft cabin air under increased pressure to the fuel cell, thereby increasing system efficiency. The APU may provide all of the electricity to the aircraft allowing for more efficient aircraft engine design and a decrease in aircraft engine size. Furthermore, the fuel cell APU can reduce airport ramp noise and exhaust emissions.

26 Claims, 4 Drawing Sheets

SOLID OXIDE FUEL CELL AS AUXILIARY POWER SOURCE INSTALLATION IN TRANSPORT AIRCRAFT

FIELD OF THE INVENTION

The present invention relates to an auxiliary power unit for an aircraft, and particularly relates to an auxiliary power unit utilizing fuel cells for an aircraft.

BACKGROUND OF THE INVENTION

It is generally known in the art to provide electricity for different functions of an aircraft such as environmental controls or systems and avionics. In addition, other electrical equipment or outlets on the aircraft, such as power outlets for passengers' use or electrical controls for controlling the aircraft, require electricity. Most often, the electricity for these systems is provided from the engines of the aircraft. The engines of the aircraft power generators which create electricity for use in these and other subsystems on the aircraft.

It is also known to provide an auxiliary power unit to provide electricity for use on an aircraft. The auxiliary power unit (APU) provides electricity in addition to, or supplementary to, the power produced by the engine generators. Generally, the APUs use gas turbine engines, similar to those of the engine, although smaller. An APU turbine is, therefore, limited in efficiency and creates gaseous emissions similar to the engines. The emissions of the APU at the airport are relatively high when compared to the engines. In addition, the APU reduces the overall fuel efficiency of the aircraft by converting jet fuel to electricity through internal combustion. Turbine APUs also reduce fuel efficiency of the aircraft.

Turbine APUs also create high levels of noise exterior to the aircraft. This requires ground crew to use extra hearing protection even when the engines of the aircraft are not running. This is generally because the turbine APUs are run at the airport to power aircraft systems prior to take off.

Therefore, it would be desirable to provide an APU which does not create additional noise and discomfort to the passengers or ground crew. In addition, it is desired to provide an efficient and clean source of electricity. It is also desired to use an APU that provides nearly all of the electricity required on an aircraft. Aircraft engines may be reduced in size and increased in efficiency by removing the need for the engines to provide compressed air and electricity to the aircraft.

SUMMARY OF THE INVENTION

The present invention relates to an auxiliary power unit (APU) for an aircraft. The auxiliary power unit, utilizing solid oxide fuel cells, creates electricity through the migration of oxygen ions. In particular, the solid oxide electrolytes of the fuel cells provide for reformed fuel to cause oxygen migration across the electrolyte. The auxiliary power unit, utilizing solid oxide fuel cells, can power systems of the aircraft and produce water for use in the aircraft. Furthermore, the auxiliary power unit can provide all of the electricity to the aircraft allowing for more efficient aircraft engine design and a decrease in aircraft engine size.

A first preferred embodiment of the present invention provides an aircraft comprising a fuselage, wherein the fuselage comprises a cabin defining a volume of air including oxygen, and an engine for powering the aircraft in flight. A fuel supply provides fuel to the engine. Electronic components are arranged in the aircraft to control a plurality of functions of the aircraft. A power unit, comprising a fuel cell, including a solid electrolyte provides a first source of electricity for the electronic components. The fuel supply supplies the fuel to the power unit so that the power unit produces electricity.

A second preferred embodiment of the present invention provides an auxiliary power unit for an aircraft. The auxiliary power unit comprises a solid oxide fuel cell including a solid oxide electrolyte. A fuel supply supplies fuel to the auxiliary power unit. A fuel reformer reforms the fuel from the fuel supply to constituent elements comprising carbon monoxide and molecular hydrogen for use in the solid oxide fuel cell. An air supply system provides an oxidizer, wherein oxidizer is oxygen to the solid oxide fuel cell. A turbine powered by the solid oxide fuel cell is adapted to provide power to the oxygen supply system. The solid oxide fuel cell is adapted to allow the transport of oxygen ions from the oxygen supply system to combine with the reformed fuel to produce electricity.

The present invention also provides for a method of providing power to an aircraft. The method involves providing a solid oxide fuel cell comprising a solid oxide electrolyte, providing a fuel to the solid oxide fuel cell, and providing an oxidizer to the solid oxide fuel cell. Electricity is produced by passing the oxidizer through the solid oxide electrolyte. The method also involves powering a reclamation system with thermal energy from the solid oxide fuel cell to provide the oxidizer to the solid oxide fuel cell.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Although the following description describes solid oxide fuel cells, it is understood that this is merely exemplary of fuel cell types which may be used as auxiliary power units in aircraft.

Figure 1:
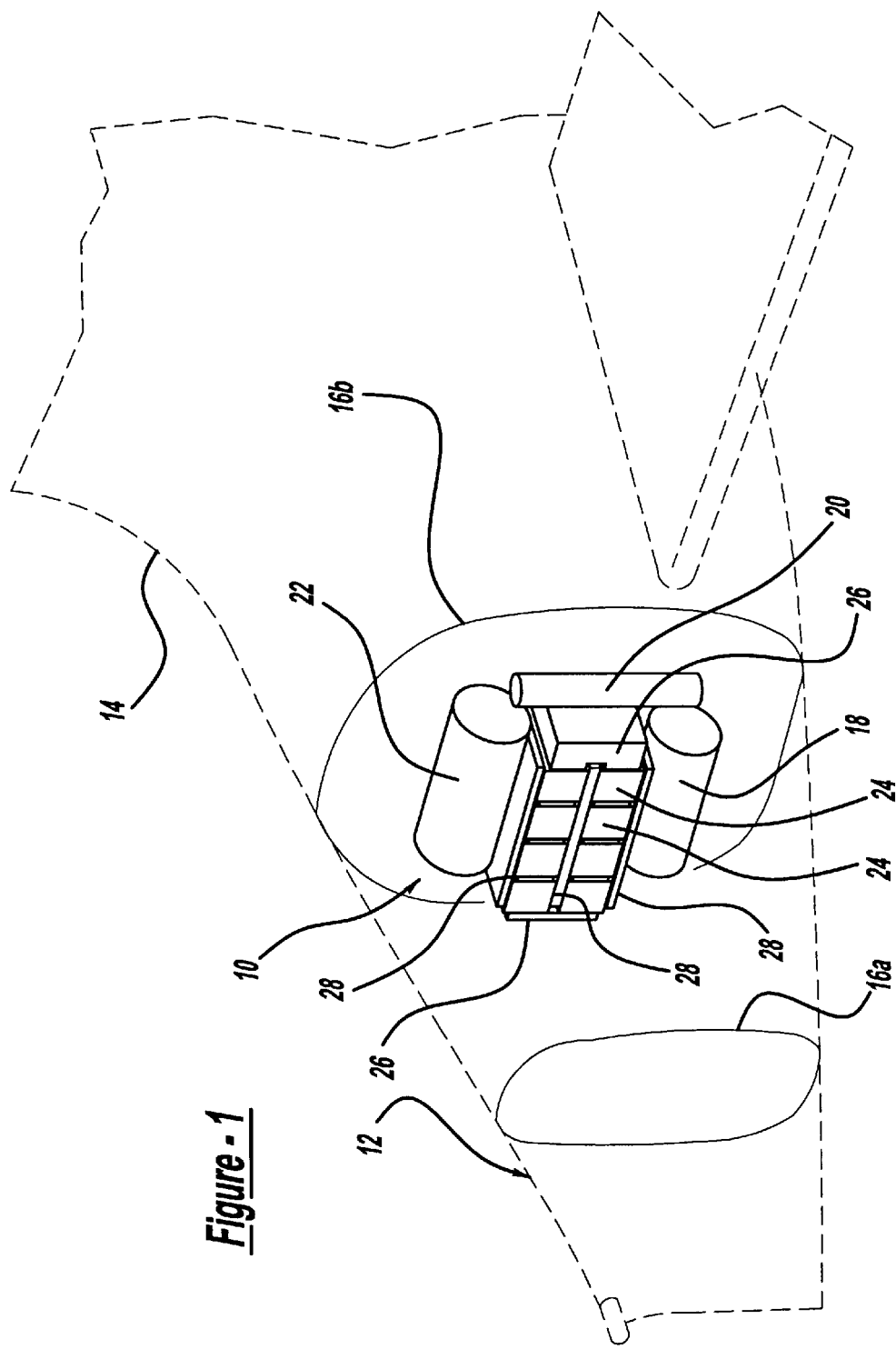
FIG. 1 is a schematic view of an auxiliary power unit according to the present invention placed in the tail section of an aircraft.

With reference to FIG. 1, an auxiliary power unit 10 for an aircraft 12 is shown. The auxiliary power unit (APU) 10 utilizes fuel cells and is generally included in a tail section 14 of the aircraft 12. More particularly, the APU 10 is generally placed within an envelope defined by a first cross-sectional area 16a and a second cross-sectional area 16b within the tail section 14.

The APU 10, utilizing fuel cells, generally includes a water sump 18, a recirculation plenum 20 and a heat exchanger complex 22. These surround a fuel cell stack 24 which is abutted by air manifolds 26 and intermingled with fuel manifolds 28. These portions generally define the APU 10 and will be discussed in greater detail herein.

Figure 2:
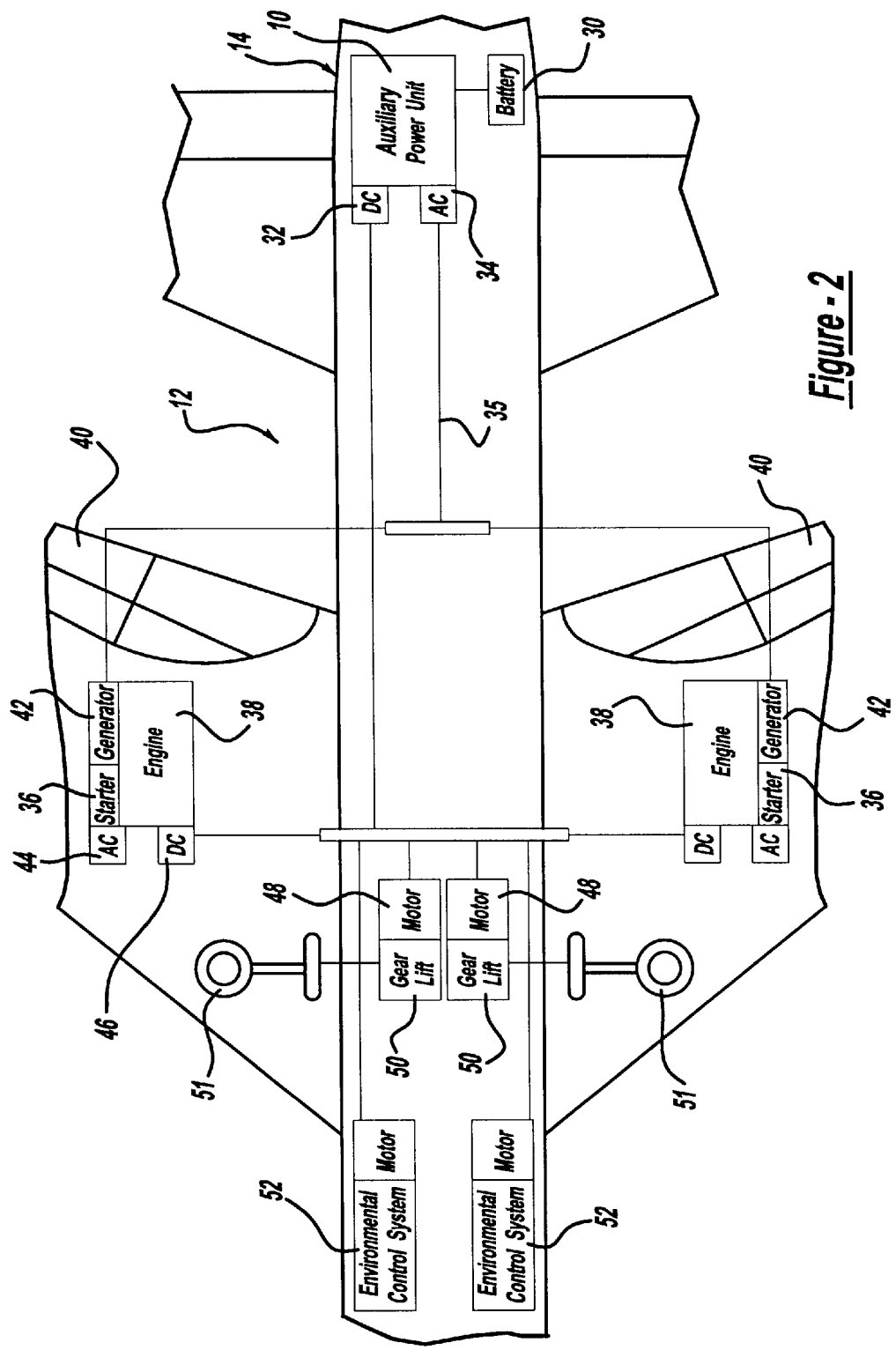
FIG. 2 is a diagrammatic view of an auxiliary power unit placed in an aircraft including electrical transmission lines to various aircraft portions.

With continuing reference to FIG. 1 and further reference to FIG. 2, the APU 10 is placed within the aircraft 12 to provide auxiliary power to the aircraft 12 and its electronic components. As discussed above, the APU 10 is generally placed within a tail section 14 of the aircraft 12. The APU 10 provides electricity to either charge a battery 30 or to power various electronic components through a direct current (DC) power unit 32. Alternatively, the APU 10 output may be converted to an alternating current (AC) with an AC converter 34. The electricity is transmitted to electrical components through transmission lines 35. The electronic components include an electric starter 36 for an engine 38 to assist in initial start-up. Other electronic components include avionics such as those to control the wing flaps 40. Power can also be routed to gear lift motors 48 to power a gear lift 50 to raise and lower a landing gear 51. Also electricity can be routed to environmental control systems 52 to power the environmental systems, such as air conditioning and air recirculation subsystems. Therefore, the APU 10 can provide power to all subsystems of the aircraft 12 which require electricity through the electrical transmission lines 35, while unneeded power is stored in the battery 30 until it is required.

If the APU 10 is not intended to provide all of the power needed for the aircraft 12, then a generator 42 is implemented and powered by the engines 38. Power can then be diverted from the generator 42 and controlled by AC regulator 44, or DC power can be provided with a DC unit 46. It will be understood that the starter 36 and the generator 42 may be the same component depending upon whether the single component is driving or being driven by the engine 38. It will also be understood that the APU 10 can be designed in such a way as to provide all electrical power necessary for powering all the electrical subsystems on the aircraft 12. With the appropriate APU 10, generators 42, which use part of the power provided by the engines 38 to create additional electricity, may not be necessary for normal flight.

Figure 3:
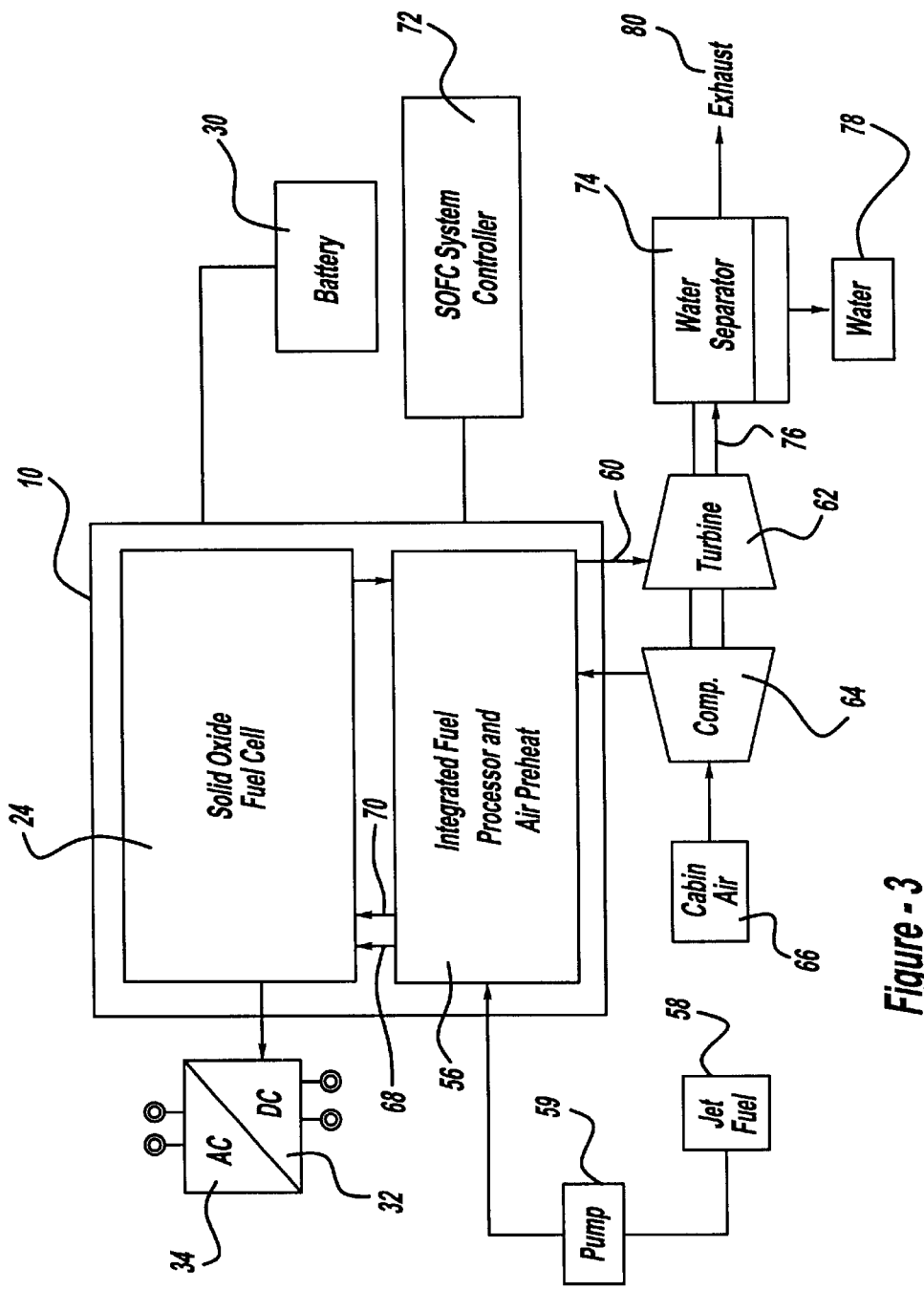
FIG. 3 is a schematic view of a simplified auxiliary power unit including fuel stacks according to a first embodiment of the present invention.

With reference to FIG. 3, the APU 10 preferably includes planar solid oxide fuel cell stacks (SOFC) 24. Although described in greater detail below, the SOFCs 24 utilize a hydrocarbon fuel and oxygen to produce electricity. The SOFCs 24 are completely solid state with no moving mechanical parts and do not require pure hydrogen to produce electricity, as do some other fuel cell technologies. The electricity can be communicated directly as DC power or converted to AC with the AC converter 34, alternatively electricity can be stored in the battery 30. A voltage stepper may also be provided to regulate the electricity produced by the APU 10. An integrated fuel processor and air preheat system (processor system) 56 is provided to first process and reform a fuel from a fuel supply 58 which is pumped to the processor system 56 with a fuel pump 59, and preheat air before they enter the SOFCs 24.

Because the APU 10 is not 100% efficient, excess heat is produced from energy which is not converted into electricity. The SOFCs 24 also operate optimally only under pressure higher than ambient. This excess energy is provided through waste energy line 60 to a turbine 62. The turbine 62 powers a compressor 64 to compress air from the cabin 66 to provide compressed air to the processor system 56. It is understood that air contains oxygen; therefore the compressor also supplies oxygen to the processor system and the SOFC 24. After fuel from the fuel supply 58 and air from the cabin 66 is compressed, the reformed fuel is provided to the SOFCs 24 through a reformed fuel line 68 while the air is provided through a compressed air line 70. An SOFC system controller 72 controls the operation of the APU 10. In particular, the SOFC system controller 72 can control the amount of fuel or air being provided to the SOFC 24 so that an efficient production of energy is created.

The turbine 62, powered by the waste energy through the waste energy line 60, can also power other systems. In particular, the turbine 10 can power a water separator 74. Exhaust from the APU 10 is provided to the water separator 74 through an exhaust line 76. The exhaust from the APU 10 includes combustion materials from the SOFC 24, which is essentially combustion products from the hydrocarbon fuel and the cabin air, which are essentially carbon dioxide and water. Therefore, the water separator 74 can separate the water to provide it to a water container 78. Therefore, even though the APU 10 may not be 100% efficient in producing electricity, a greater operational or overall efficiency can be achieved by using the excess heat energy and exhaust from the APU 10 to power the turbine 62 to separate water from the exhaust, which may be used on the aircraft 12.

Figure 4:
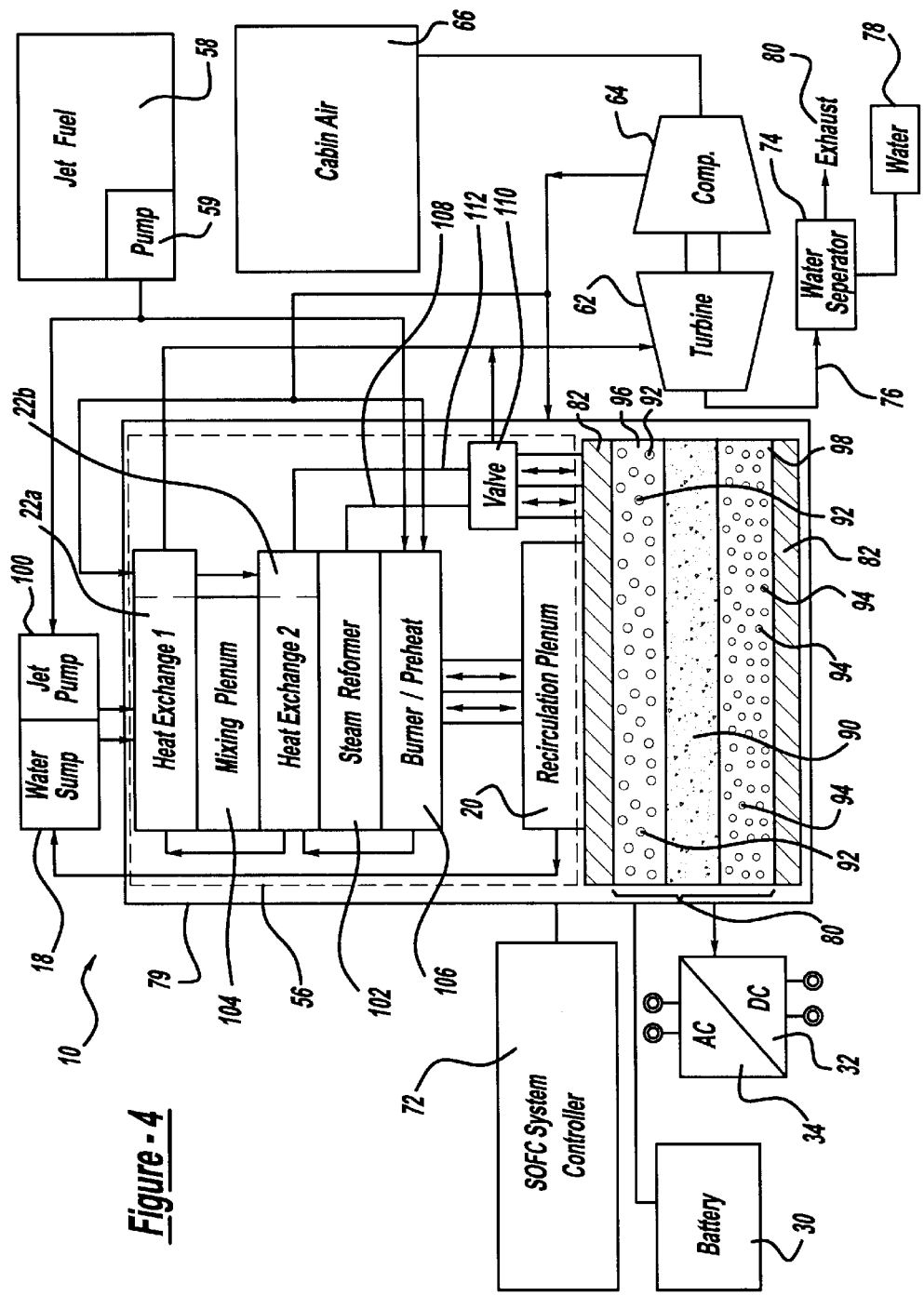
FIG. 4 is detailed schematic view of an auxiliary power unit as illustrated in FIG. 3.

With reference to FIG. 4, the APU 10 is shown in greater detail. The APU 10 may be enclosed in a pressure vessel 79. The pressure vessel 79 encloses at least the SOFCs 24 and the processor system 56. Among other things, the pressure vessel 79 decreases the chance of gas leakage due to pressure differentials during operation. In addition, the pressure vessel 79 reduces the mechanical strength requirements of both the SOFC 24 and the processor system 56 for installation into an aircraft 12.

The SOFC 24 includes a plurality of a planar solid oxide fuel cell 80, nevertheless only one is illustrated for clarity. Although only planar solid oxide fuel cells 80 are described herein, it will be understood the SOFC 24 may be in any appropriate arrangement. Each fuel cell 80 may be surrounded by a barrier 82 which is impermeable to the oxidizer and fuel which are provided to the fuel cell 80. This creates discrete fuel cells 80 which may be placed in series.

Each fuel cell 80 also includes a solid oxide layer 90 with a reformed fuel layer 92 adjacent the solid oxide layer 90 and an oxidizer layer 94 adjacent the solid oxide layer 90, but opposite the reformed fuel layer 92. The solid oxide layer 90 provides a physical barrier between the reformed fuel layer 92 and the oxidizer layer 94. The solid oxide layer 90 also performs the function of an electrolyte in the fuel cell 80. In addition, a first electrode 96, which is generally porous, is disposed adjacent one side of the solid oxide layer 90, for example in the fuel layer 92. A second electrode 98, also generally porous, is disposed adjacent a second side of the solid oxide layer 90, for example in the oxidizer layer 94. Generally, the first and second electrodes 96 and 98 are porous and span the space between the barrier 82 and the solid oxide layer 90. In this way the oxidizer layer 94 and the fuel layer 92 flow through the respective electrodes 96 and 98.

The solid oxide layer 90 may be any appropriate solid electrolyte such as a metal oxide. One exemplary material is zirconium oxide that has been doped with a rare earth metal. Exemplary rare earth metals include yttrium, scandium, or cerium. Other exemplary metal oxides also include calcium oxide. It is preferred to have the dopant comprise between about 5% and about 20% by weight of the solid oxide layer 90. It will be understood, however, that any appropriate solid oxide may be used in the SOFC 24.

It will be understood that the SOFC 24 may contain any number of solid oxide layers 90 and a limited number is illustrated simply for clarity. A plurality of the fuel cells 80 are placed adjacent one another to form the SOFC 24. It will also be understood that the configuration of the SOFC 24 may compromise any appropriate configuration to provide the APU 10.

The reformed fuel is reformed in the processor system 56 to break the fuel into substantially carbon monoxide, $H_2$, or hydrogen atoms which are components of hydrocarbon fuels. Although the processor system 56 is described herein using steam, it will be understood that other reformation systems may be used. For example, an auto thermal, thermal decomposition, or partial oxidation techniques may also be used to reform the fuel for the APU 10. The constituents of the reformed fuel are the fuel for the SOFC 24 and are present in the fuel layer 92. The oxidizer layer 94 includes air from the cabin 66 that has been compressed to concentrate the oxygen present in air in the cabin 66. The oxygen in the air is the oxidizer in oxidizer layer 94. It will be understood, however, that another oxidizer or oxygen from a different source may be used in oxidizer layer 94. The solid oxide layer 90 allows the oxygen ions present in the oxidizer layer 94 to transport through the solid oxide layer 90 to combine with the fuel in the fuel layer 92. The migration of oxygen ions across the solid oxide layer 90 produces, by creating an electrical potential, electricity. The potential is created between the two electrodes 96, 98 in the fuel cell 80. In the fuel layer 92 the oxygen combines with carbon monoxide, $H_+$, or $H_2$ to form $CO_2$ and $H_2O$.

The heat exchanger complex 22, in the processor system 56, may further include a first heat exchanger 22a and a second heat exchanger 22b. A recirculation plenum 20 is also diagrammatically shown to illustrate the capability of the APU 10 to reuse resources such as water or air. The water sump 18 provides water to the system. Water provided in the water sump 18 may either come from the water supply 78, from the water separator 74, or from an onboard water supply. A jet pump 100 pumps water from the water sump 18 into the processor system 56. The first heat exchanger 22a heats the water and jet fuel to bring them up to the temperature necessary to vaporize the liquid mixture into gaseous form. The second heat exchanger 22b further heats the steam and jet fuel mixture before entry into the mixing plenum 104. The mixing plenum 104 allows for a remix of the steam and jet fuel mixture from the first heat exchanger 22a to the second heat exchanger 22b ensuring that a proper mix has been accomplished before entry into the steam reformer 102. This helps to prevent fuel coking at too high of a temperature and to ensure that enough steam is produced to prevent fuel coking.

The steam reformer 102 breaks the fuel into simpler molecular components to provide the proper components to the SOFCs 24. A preheater 106 provides additional energy to the steam reformer 102 and to the second heat exchanger 22b to ensure that the water is converted to steam for use in the steam reformer 102. Additionally, fuel and air may be transferred between the recirculation plenum 20 and the preheater 106 to allow for an initial heat up of the SOFCs 24 for initial start-up.

After the fuel has been reformed in the steam reformer 102 it travels through a reformed fuel line 108 to be fed into the SOFCs 24. A valve 110 controls the flow of reformed fuel through the reformed fuel line 108 and air through an air line 112. The valve 110 is controlled by the SOFC system controller 72 to create the proper mix of fuel and air in the SOFC 24 to ensure the most efficient power production.

The SOFCs 24 work most efficiently when they are between about 600° C. and 1000 (° C.) (about 1112° F. and about 1832° F.). Therefore, if the SOFCs 24 have cooled due to not being operated or because of a cool environment, they are most efficient after being first heated. The preheater 106 assists in heating the SOFCs 24 to ensure that they reach the optimal operating temperature quickly. Fuel is supplied to the preheater 106 from the fuel supply 58 to be used to heat the water for use in the steam reformer 102. Therefore, the fuel and oxygen may also be heated before entering the SOFC 24.

Though any appropriate configuration may be used to provide the fuel cell 80 of the APU 10, the solid oxide fuel cells 80 are preferred for aircraft because fuel cells 80 do not require pure hydrogen for proper operation. In particular, the reformed jet fuel from the jet fuel supply 58, which is already provided on an aircraft 12, can be used to provide the hydrogen and carbon monoxide to cause the migration of oxygen ions across the solid oxide layer 90. Generally, preferred are carbon monoxide and atomic hydrogen, but molecular hydrogen is also usable. Therefore, rather than requiring the inclusion of another fuel source, particularly a highly explosive hydrogen fuel source, reformed jet fuel can be used to power the SOFCs 24. Furthermore, the APU 10 allows for the recirculation and re-use of cabin air from the cabin 66 to provide the oxygen for the SOFCs 24. Again, rather than providing a pure oxygen source, compressed air from the cabin 66 or reformed water may be used to provide the oxygen source for the SOFCs 24.

Furthermore, the turbine 62 of the APU 10 is part of a reclamation system. The reclamation system allows for the reuse of waste thermal energy produced by the APU 10 to power a turbine to reform exhaust produced by the APU 10. The turbine 62 powers the compressor 64 to convert the exhaust into usable water. In particular, the exhaust of the APU 10 using SOFCs 24 generally consists substantially only of $H_2O$ and $CO_2$. Therefore, the $H_2O$ may be separated, with the water separator 74 and stored in the water container 78, to provide water for use in the aircraft 12. Furthermore, the water can be used for other uses in the aircraft 12 such as general humidity control in the environment control systems 52 and other gray water uses.

An SOFC 24 is theoretically approximately 45–55% efficient. Due to certain inefficiencies and other physical constraints, however, the APU 10 is generally approximately 30–40% efficient. It is this waste thermal energy which provides the energy required to power the turbine 62 to power the compressor 64. The turbine 62 is an expansion turbine which uses hot gases to expand through turbine blades to spin the blades. This provides kinetic energy for things such as powering the compressor 64.

It will be understood that varying configurations of the APU 10 can be used to provide different amounts of electricity to aircraft 12. Therefore, the aircraft 12, where the APU 10 only provides a portion of the electricity to the aircraft 12, especially when the aircraft 12 is on the ground, can be provided. When the APU 10 is provided in the aircraft 12, especially when the aircraft 12 is in flight, the engines 38 may power a generator 42 to provide electricity necessary for the aircraft 12. During this time, the APU 10 can charge the battery 30 to provide additional power for later use.

The APU 10 can also be designed to provide all the electricity at all times so that the engines 38 never need to provide electricity to the aircraft 12. In this way, the engines 38 can be decreased in size and increased in efficiency since they will not need to power generators 42 to provide electricity. Therefore, the overall efficiency of the components of the aircraft 12 can be increased by using the APU 10 to provide all the electricity necessary to power the electrical subsystems of the aircraft 12.

It will also be understood that the foregoing description of the preferred embodiments is merely exemplary. For example, the processor system 56 could be integrated further into the SOFCs 24. Therefore, rather than having separate components separated physically from the SOFCs 24, the processor system 56 can be designed so that it is interspersed with the SOFCs 24. Furthermore, the size or number of SOFCs 24 can be augmented depending upon the amount of electricity required for a particular application.

The mixture of the fuel in the SOFC 24 may include between about 2–3% excess fuel to resist corrosion of the electrodes 96 and 98. In addition, the SOFC 24 is preferably pressurized to a pressure between about 20 and about 30 psi to increase efficiency of the SOFCs 24. The air from the cabin 66, which is compressed by the compressor 64, may both pressurize and cool the SOFCs 24. Generally, the greatest electrical density is formed on the SOFC 24 when the pressure is between about 20 psi and about 30 psi. Therefore, not only does the air provided by the compressor provide oxygen to the oxidizer layer 94, it also cools the SOFCs 24 by pulling air through the heat exchangers 97, 98. This air can also be used to pressurize the SOFCs 24 to increase the electrical density of the SOFCs 24.

It will also be understood that the solid oxide layers 90 may be formed from any appropriate material such as those that are doped with calcium oxide and scandium oxide. The solid oxide layer 90 provides the electrolyte that ions of oxygen may transfer through. The solid oxide layer 90 also separates the reformed fuel layer 92 from the oxidizer layer 94. Therefore, the oxygen ions must cross through the solid oxide layer 90, thereby creating a charge differential and the flow of electricity. Although the SOFC 24 has been described herein, it will be understood that various other fuel cells may be used. Generally, a fuel cell causes the migration of an oxidizer, such as oxygen ions, across an electrolyte to produce electricity. Other possible fuel cells include PEM fuel cells, which require hydrogen ions as the fuel source alone and carbon must be scrubbed from the fuel before entering the fuel layer 92.

The APU 10 of the present invention thus provides an efficient and quiet source of electricity to the aircraft 12. In particular, the APU 10 is entirely solid state. Therefore, the APU 10 will not produce any vibrations or noise to disturb the passengers in the cabin 66. Additionally, the APU 10, using SOFCs 24, is theoretically approximately between about 30 and about 60 percent efficient. Even though physical and mechanical constraints presently provide APUs 10 which are generally between about 30 and about 40 percent efficient. Turbines are generally between about 20 and about 30 percent efficient. Therefore, the APU 10, according to the present invention, provides electricity to the aircraft 12 at an increased efficiency of between about 10 and about 20 percent. This increases overall fuel efficiency of the aircraft 12 and provides a cleaner source of electricity to the aircraft 1

The APU 10 also assists in decreasing undesirable emissions such as nitrous oxide emissions. Because nitrous oxides are generally produced at elevated temperatures, generally above 1500° C., substantial amounts of nitrous oxides are not produced in the APU 10. This is because the SOFC 24 operates at a temperature generally below about 1400° C. Therefore, nitrous oxide emissions are substantially eliminated and much below the emissions of gas turbine power units.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An aircraft comprising:

a fuselage comprising a cabin;

an engine for powering the aircraft;

a fuel supply to provide fuel to said engine;

an electronic component disposed in the aircraft to control or operate at least one function of the aircraft;

a power unit comprising a fuel cell; and a reclamation turbine which is powered by thermal energy produced by said fuel cell;

wherein said fuel supply supplies said fuel to said power unit so that said power unit provides a first source of electricity for said electronic components.

2. The aircraft of claim 1 further comprises:

a fuel reformer to reform said fuel into constituents of said fuel comprising carbon monoxide or hydrogen;

a compressor to compress a portion of a volume of air in said cabin to provide oxygen to said fuel cell;

wherein said fuel cell includes a solid oxide; and wherein said reformed fuel is supplied to a first side of said solid oxide electrolyte and said oxygen is supplied to said second side of said solid oxide electrolyte.

3. The aircraft of claim 2, wherein said reclamation turbine powers said compressor.

4. The aircraft of claim 2, further comprising:

an air preheater to heat said portion of said air before said air provides said oxygen to said fuel cell; and wherein said fuel reformer and said air preheater are positioned adjacent said fuel cell.

5. The aircraft of claim 4, wherein said air preheater heats said portion of said air to between about 600° C. and about 1000° C.; and wherein said compressor compresses air adjacent said fuel cell stack to a pressure between about 20 pounds per square inch and about 30 pounds per square inch.

6. The aircraft of claim 1, further comprising a generator which is powered by said engine to provide a second source of electricity for said electronic components.

7. The aircraft of claim 1, wherein said solid oxide electrolyte is permeable to oxygen ions.

8. The aircraft of claim 1, wherein said solid oxide electrolyte comprises a rare earth metal doped zirconium oxide, wherein said rate earth metal is between about 2% and about 15% by weight of said solid oxide.

9. The aircraft of claim 1, further comprising:

a first electrode adjacent said first side;

a second electrode adjacent said second side; and wherein an electrical charge collected on either said first or said second electrode is adapted to provide said first source of electricity.

10. The aircraft of claim 9, wherein said first electrode is adjacent the reformed fuel supplied to said power unit and performs the function of a cathode to collect a negative charge.

11. The aircraft of claim 1, further comprising a plurality of said fuel cells to form a fuel cell stack wherein each fuel cell includes:

a fuel layer; and an oxygen layer;

wherein said solid oxide selectively separates said fuel layer and said oxygen layer.

12. An auxiliary power supply unit for an aircraft comprising:

a fuel cell including a solid oxide electrolyte;

a fuel supply to supply a fuel to the auxiliary power unit;

a fuel reformer to reform said fuel to constituent elements comprising carbon monoxide and hydrogen for use in said fuel cell;

an oxidizer supply system to provide an oxidizer to said fuel cell;

a turbine powered by said fuel cell adapted to provide power to said oxidizer supply system; and wherein said fuel cell is adapted to allow the transport of said oxidizer from said oxidizer supply system to combine with said reformed fuel to produce electricity for use on said aircraft.

13. The auxiliary electricity supply unit of claim 12, wherein said reformed fuel is supplied to a first side of said solid oxide electrolyte and said oxidizer is supplied to a second side of said solid oxide electrolyte.

14. The auxiliary electricity supply unit of claim 13, wherein said solid oxide electrolyte provides a temporary mechanical barrier between said reformed fuel and said oxidizer; and wherein said solid oxide electrolyte is permeable to said oxidizer.

15. The auxiliary electricity supply unit of claim 12, wherein said oxidizer supply system comprises:

a compressor to provide compressed air including said oxidizer to said solid oxide fuel cell;

a heater to provide thermal energy to the compressed air;

a supply line which operably interconnects said compressor and said solid oxide fuel cell; and wherein said turbine powers said compressor.

16. The auxiliary electricity supply unit of claim 12, wherein said fuel comprises a hydrocarbon.

17. The auxiliary electricity supply unit of claim 12, wherein said fuel reformer breaks said fuel into its constituent particles including carbon monoxide, atomic hydrogen, or hydrogen molecules.

18. The auxiliary electricity supply unit of claim 12, further comprising:

a first electrode adjacent a first side of said solid oxide electrolyte;

a second electrode adjacent a second side of said solid oxide electrolyte; and wherein an electrical charge is collected on said first or said second electrode to provide said electricity.

19. The auxiliary power supply unit of claim 12, wherein said solid oxide fuel cell produces an exhaust and said exhaust powers said turbine.

20. A method of providing electricity to an aircraft comprising:

providing a fuel cell comprising a solid oxide electrolyte;

providing a fuel to said fuel cell;

providing an oxidizer to said fuel cell;

producing electricity by passing said oxidizer through said solid oxide electrolyte; and powering a reclamation system with energy from said fuel cell to provide at least a portion of said oxidizer to said fuel cell.

21. The method of claim 20, wherein said fuel cell comprises a solid oxide fuel cell and providing said fuel cell includes providing a solid oxide fuel cell stack including a plurality of said solid oxide fuel cells.

22. The method of claim 20, wherein providing said solid oxide electrolyte includes:

providing a metal oxide electrolyte that is permeable to oxygen ions;

placing a first electrode on a first side of said solid oxide electrolyte;

placing a second electrode on a second side of said solid oxide electrolyte; and allowing oxygen ions to travel across said solid oxide electrolyte to create an electromotive force.

23. The method of claim 20, wherein providing fuel includes:

providing a hydrocarbon fuel reformer;

providing a hydrocarbon to said hydrocarbon fuel reformer having molecules comprising between about three carbon atoms and about twelve carbon atoms;

providing steam to said hydrocarbon fuel reformer; and breaking apart said hydrocarbon molecules to reformed particles including up to about three carbon atoms or up to about two hydrogen atoms.

24. The method of claim 20, wherein providing said oxidizer comprises:

providing a volume of air including oxygen;

compressing said volume of air; and providing said compressed air to said solid oxide fuel cell.

25. The method of claim 20, wherein powering said reclamation system includes:

providing an expansion turbine;

providing a compressor;

powering said compressor with said expansion turbine; and compressing a volume of air with said compressor.

26. The method of claim 20, wherein powering said reclamation system includes:

providing an exhaust conversion system;

providing an expansion turbine;

powering said exhaust conversion system with said expansion turbine;

providing exhaust from said solid oxide fuel cell to said exhaust conversion system; and converting a portion of said exhaust to water.

* * * * *